(12) United States Patent
Potter et al.

(10) Patent No.: US 12,412,233 B1
(45) Date of Patent: Sep. 9, 2025

(54) COLOR STATE TECHNIQUES FOR GRAPHICS PROCESSORS

(71) Applicant: Apple Inc., Cupertino, CA (US)

(72) Inventors: Terence M. Potter, Austin, TX (US); Yoong Chert Foo, London (GB); William V. Miller, Austin, TX (US)

(73) Assignee: Apple Inc., Cupertino, CA (US)

( * ) Notice: Subject to any disclaimer, the term of this patent is extended or adjusted under 35 U.S.C. 154(b) by 592 days.

(21) Appl. No.: 17/929,568

(22) Filed: Sep. 2, 2022

(51) Int. Cl.
| | |
|---|---|
| *G06T 1/60* | (2006.01) |
| *G06T 1/20* | (2006.01) |
| *G06T 11/00* | (2006.01) |
| *G06T 15/40* | (2011.01) |
| *G06T 15/50* | (2011.01) |
| *G06T 11/40* | (2006.01) |

(52) U.S. Cl.
CPC ............ *G06T 1/60* (2013.01); *G06T 1/20* (2013.01); *G06T 11/001* (2013.01); *G06T 15/405* (2013.01); *G06T 15/503* (2013.01); *G06T 11/40* (2013.01)

(58) Field of Classification Search
None
See application file for complete search history.

(56) References Cited

U.S. PATENT DOCUMENTS

| | | | |
|---|---|---|---|
| 10,585,670 B2 | 3/2020 | Abdallah | |
| 2007/0121133 A1* | 5/2007 | Bourgoin | H04N 1/6052 358/1.9 |
| 2017/0345122 A1* | 11/2017 | Seiler | G06F 12/1009 |
| 2017/0345186 A1* | 11/2017 | Seiler | G06T 1/20 |
| 2018/0308211 A1* | 10/2018 | Surti | H04N 19/176 |
| 2018/0308258 A1* | 10/2018 | Hellier | G06F 17/16 |
| 2019/0096117 A1* | 3/2019 | Burke | G06T 15/04 |
| 2019/0354265 A1* | 11/2019 | Winnemoeller | G06F 3/04845 |
| 2020/0159871 A1* | 5/2020 | Bowen | G06T 11/60 |
| 2021/0358174 A1* | 11/2021 | Pillai | G06T 9/00 |
| 2023/0081389 A1* | 3/2023 | Petersen | G06T 11/40 345/441 |

* cited by examiner

*Primary Examiner* — Jwalant Amin
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to storage techniques for fragment data. In some embodiments, one or more storage circuits are configured to store sample color data for processing by shader processors including a data structure that includes first and second elements configured to store color data for first and second colors, respectively. In some embodiments, control circuitry is configured to generate color state metadata to map samples in a region of pixels to colors in elements of the data structure, including to map multiple samples to the first element of the data structure. In some embodiments, control circuitry is configured to access the color state metadata to determine a mapped element of the data structure for a given sample and read the color data from the mapped element of the data structure. Disclosed techniques may improve, reduce or avoid duplication and thereby improve cache efficiency for accesses to color data.

20 Claims, 11 Drawing Sheets

COLOR STATE TECHNIQUES FOR GRAPHICS PROCESSORS

BACKGROUND

Technical Field

This disclosure relates generally to graphics processing and more particularly to storage techniques for fragment data.

Description of the Related Art

Graphics processors typically perform fragment processing tasks to render a frame of graphics data. Generally, data for a pixel (which may be referred to as a fragment) may have multiple samples (e.g., in multi-sample anti-aliasing (MSAA)), with each sample having a color from a multitude of different representable colors. Storage techniques and cache efficiency for pixel data may have substantial effects on performance and power consumption.

DETAILED DESCRIPTION

Anti-aliasing is a technique that is typically used to smooth jagged edges in digital images and improve image quality. MSAA is one type of anti-aliasing that represents a given pixel using multiple samples, where each sample has a color that may be chosen from a multitude of different representable colors. In some cases, multiple samples of a pixel may represent the same color. Storing repeated color data is redundant and may cause inefficient cache usage, relative to disclosed techniques. Speaking generally, cache thrashing may substantially reduce performance in the context of graphics shader programs, so reducing or avoiding thrashing may be desired. Note that disclosed techniques are not limited to the MSAA context, but may be used in various situations where pixels or samples may have redundant color data.

In some embodiments, discussed in detail below, color state metadata maps samples in a region of pixels to colors in a multi-dimensional data structure that stores color data (this data structure may be referred to as a local image block). The color state metadata may map multiple samples to the same element of the data structure when the samples share a color. This type of compression, while it may not change the overall memory allocation for the data structure, may increase cache hits when accessing the shared element (relative to store the same color data in multiple elements of the data structure, which may cause the same color data to be stored on different cache lines).

Further, in some embodiments, region state metadata maps different regions of the data structure (which may be referred to as "slabs") to different subsets of the color state metadata. This two-level paradigm may facilitate efficient cache accesses for the color state metadata itself (e.g., when multiple slabs share the same color state metadata).

Graphics Processing Overview

Figure 1A:
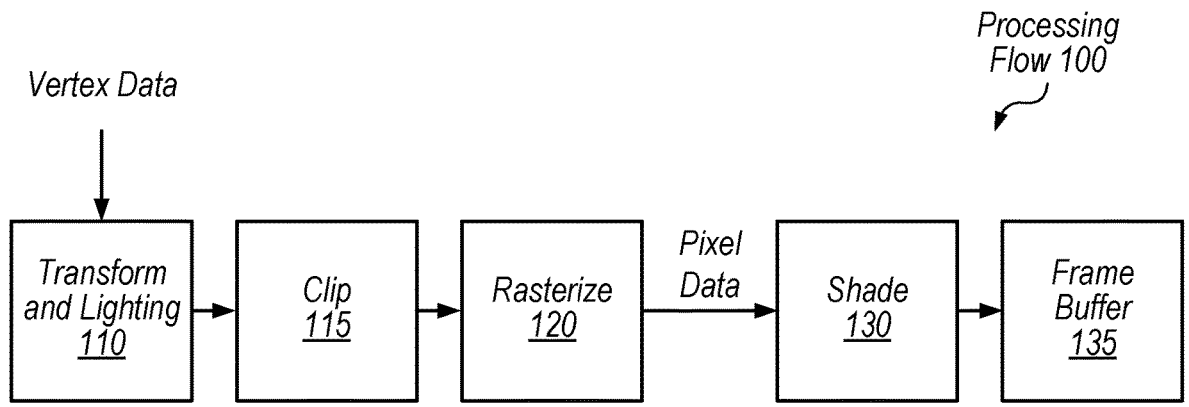
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
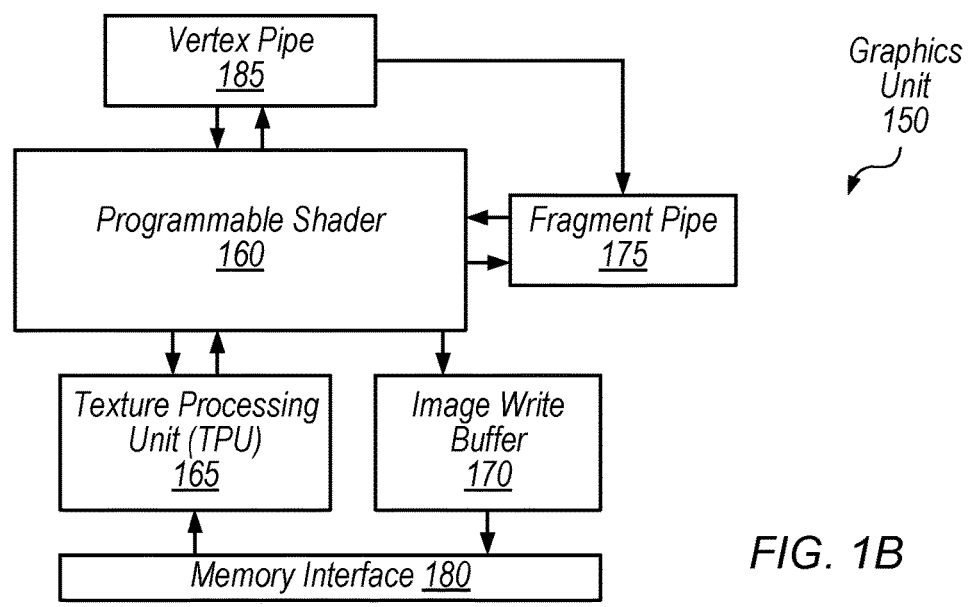
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread groups), single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Overview of Color Data Metadata

Figure 2:
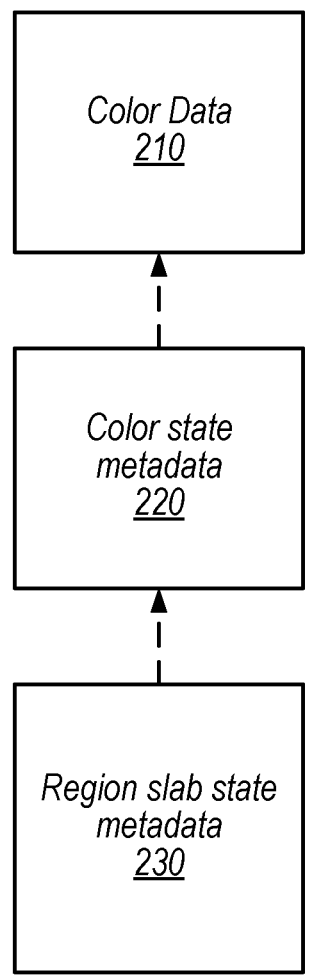
FIG. 2 is a block diagram illustrating example color state and region slab state metadata for color data, according to some embodiments.

FIG. 2 is a block diagram illustrating example color state and region slab state metadata for color data, according to some embodiments. The illustrated embodiment includes color data 210, color state metadata 220, and region slab state metadata 230.

Color data 210, in the illustrated embodiment, includes color information for one or more samples of one or more pixels. In some embodiments, each pixel may have multiple samples (e.g., for MSAA), with each sample having a color from a multitude of different representable colors.

In some embodiments, color data 210 is stored in a multi-dimensional data structure. This type of hardware-supported structure is referred to herein as a local image block (LIB) and is discussed in detail below with reference to FIG. 4.

Color state metadata 220, in the illustrated embodiment, provides a mapping of samples in a region of pixels to colors (e.g., color data 210) in elements of the LIB, which is organized in slabs (which may be described by slab descriptors). These mappings may use pointers, for example. In some embodiments, each pixel may be represented by an array of pointers, where each pointer represents a color mapping for a particular sample. In some embodiments, each slab descriptor is for a subset of the depth dimension of the LIB.

In some embodiments, color state metadata 220 is a first layer of metadata that describes color data 210 while region slab state metadata 230 is a second layer of metadata that describes color state metadata 220.

Region slab state metadata 230, in some embodiments, provides a per-depth-portion (e.g., per-byte in depth dimension) array that points to a slab descriptor for a given depth portion. Thus, region slab state metadata 230 maps depth portions to the slab descriptors discussed above with reference to color state metadata 220.

In various embodiments, disclosed techniques may store color data for processing by graphics circuitry to generate pixel data for a frame of graphics data. Once rendered, the frame may eventually be displayed, e.g., via a display unit.

Control circuitry may utilize various techniques to detect that two samples can be mapped to the same color data. In some embodiments, the act of performing a single store operation may determine the extent of a color. In other embodiments, control circuitry may compare color data in the LIB to determine whether two samples actually refer to the same color. These different techniques may have design tradeoffs in terms of logic cost and memory footprint.

Detailed Color Data Metadata

Figure 3:
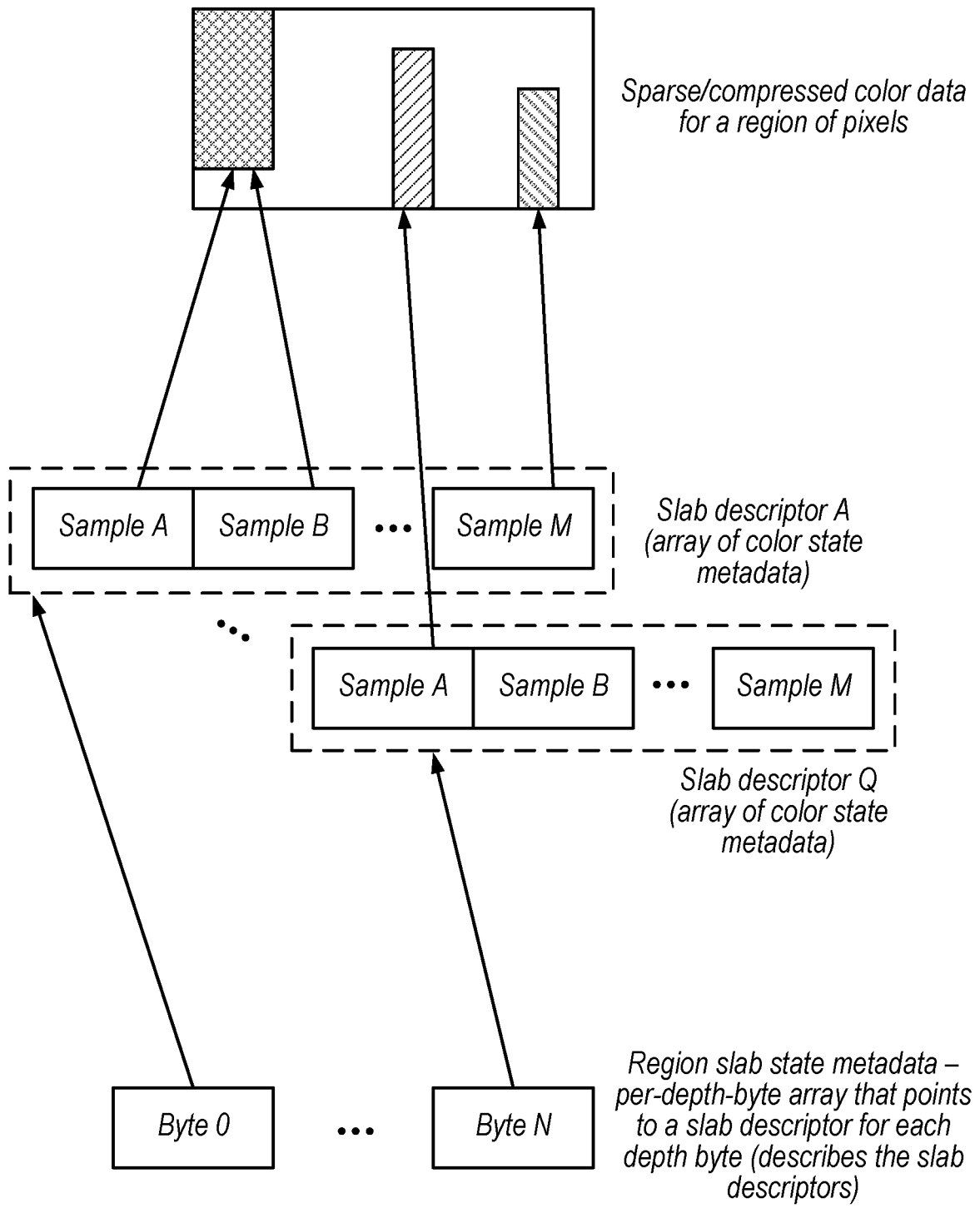
FIG. 3 is a block diagram illustrating detailed example color state and region slab state metadata for color data, according to some embodiments.

FIG. 3 is a block diagram illustrating detailed example color state and region slab state metadata for color data, according to some embodiments. Disclosed metadata may be stored in dedicated circuitry or in a graphics memory space. In either case, disclosed data may be memory backed, e.g., in a unified memory architecture. In some embodiments, color data and metadata is accessible to shader processor circuitry via a cache/memory hierarchy with multiple levels.

Starting from the bottom of FIG. 3, in the illustrated embodiment, region slab state metadata (e.g., region slab state metadata 230 of FIG. 2) provides a per-depth-byte array that points to a slab descriptor for each depth byte of the LIB. In some embodiments, region slab state metadata describes slab descriptors A-Q. Note that multiple bytes may point to the same slab descriptor, which may improve cache hit rate. In some embodiments, the N byte array may initially have all bytes point to a single slab descriptor. In other embodiments, the N byte array may initially have bytes point to more than a single slab descriptor.

In some embodiments, region slab state metadata maps different locations of the LIB in a depth dimension to different subsets of the color state metadata, where the subsets of the color state metadata correspond to slab descriptors A-Q for slabs in the depth dimension of the LIB in FIG. 3. Note that the depth dimension is used for purposes of explanation, but similar techniques may be used for other dimensions of a data structure for storing fragment data.

In some embodiments, a write operation (e.g., initiated by a graphics process) may or may not alter the mapping of the per-depth-byte array that points to slab descriptors A-Q. For example, a write operation that writes to a subset of bytes, as discussed in detail below with reference to FIG. 5C, causes the slab descriptor cache to fracture one slab descriptor into multiple slab descriptors for different subsets of the depth dimension. In this scenario, the fracture may cause one or more bytes (but less than all bytes) in region slab state metadata to update and point to the new slab descriptor. Slab descriptors may be stored in a slab descriptor cache, in some embodiments.

As another example, in response to a write operation that writes to all bytes, as discussed in detail below with reference to FIG. 5B, all bytes of region slab state metadata maintain their mapping to slab descriptor A-Q in the slab descriptor cache.

In the illustrated embodiment, slab descriptors A-Q each provide mappings for a subset of the depth dimension (e.g., of the LIB). In some embodiments, slab descriptors A-Q include an array of pointers that indicate the color for each sample at that subset (e.g., color state metadata 220 of FIG. 2).

In the illustrated embodiment, this two-stage paradigm enables sparse/compressed color data for a region of pixels, where a color is stored once for multiple samples that use the same color. Note that a given color may be represented using any of various appropriate encodings and that some colors may be represented using different data sizes (e.g., different numbers of bytes), in some embodiments.

Exemplary Local Image Block Data Structure

Figure 4:
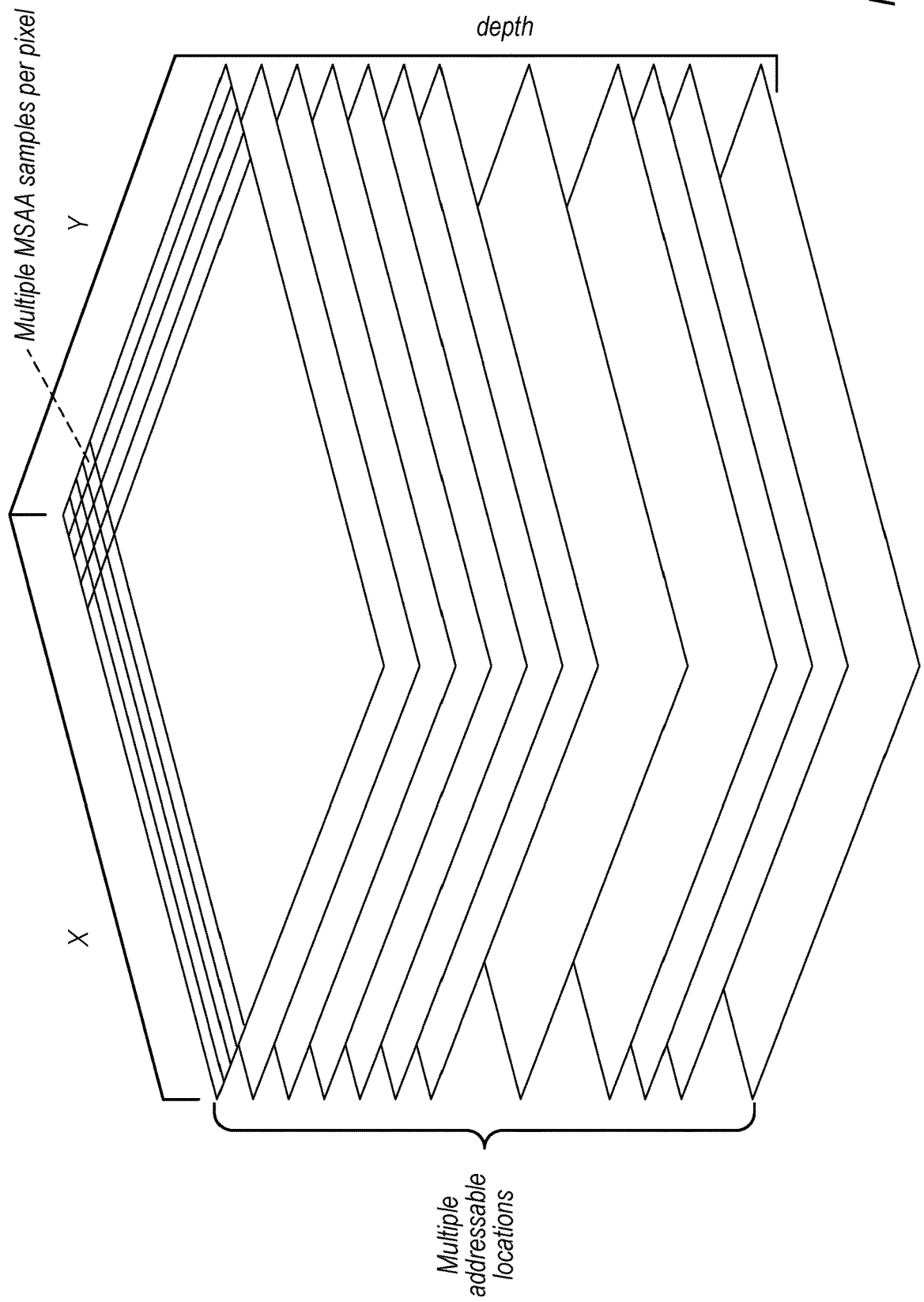
FIG. 4 illustrates an exemplary data structure configured to store color data, according to some embodiments.

FIG. 4 illustrates an exemplary LIB data structure configured to store color data, according to some embodiments. For example, the LIB structure may store color data 210. In some embodiments with unified memory architectures, the LIB is memory-backed, along with various GPU-utilized memory spaces. Therefore, storage of the LIB may utilize one or more caches in a memory hierarchy that are also shared with data from other memory spaces. In this context, improving cache hit rate for the LIB may improve performance for LIB-based tasks as well as other tasks that access data in shared cache(s).

In the illustrated embodiment, the size of the LIB is configurable in four dimensions: an X direction (e.g., with units of pixels), a Y direction (e.g., with units of pixels), a number of samples per pixel, and a depth (an amount of data per sample). In some embodiments, shader programs include instructions to declare a LIB structure and configure its size by writing to hardware registers in graphics unit 150. Thus, in the illustrated embodiment, the size of the LIB structure in bytes is X times Y times $2^{samples\_per\_pixel}$ times depth, where depth is in units of bytes per sample. In some embodiments, LIBs are configurable in additional dimensions (e.g., a Z-dimension for three-dimensional displays such as holograms, for example).

In some tile-based embodiments, for fragment processing, the X and Y dimensions are set to correspond to the size of a tile being processed. For other tasks such as compute tasks, the X and Y dimensions may be customized for the particular task (e.g., with a greater number of entries in the X dimension than the Y dimension, or vice versa, for a line buffer task). In some embodiments, the number of samples per pixel is based on the MSAA mode and may range from a single sample per pixel to four samples per pixel (or more), for example. In some embodiments, storing multiple samples per pixel may also be useful for other graphics tasks in which MSAA is not used. The depth may be adjusted to store different numbers of color attachments or other pixel data for each sample. LIBs may be configured to implement a g-buffer, for example, and/or other types of buffers.

The term "slice" may be used to refer to an addressable location in the depth dimension across all pixel locations (e.g., a byte slice of the LIB across all X, Y, and sample values). A given "slab" may include one or more slices.

In some embodiments, fragment functions can access LIB slices/slabs as color attachments or using an explicit layout declared in the shader. In some embodiments, explicit layout elements may use scalar, integer, or floating-point data types, or certain pixel data types.

In some embodiments, an API provides functions for compute kernels to declare local image blocks, query attributes of an existing LIB (e.g., width, height, number of samples, number of colors at a given x/y coordinate, etc.), get a reference to image block data for a specific location in the LIB, write to an LIB location, read from a region of an LIB slice (e.g., to write data from the LIB to a specified texture region), etc. In some embodiments, the API allows structures to be shared between kernel and fragment functions in order to facilitate sharing between pixel and compute functions. This may facilitate the mid-render compute functionality in various mid-render compute techniques. In some embodiments, LIBs can be at least partially re-configured mid-render, e.g., by altering the dimensions of the LIB in one or more directions. In some embodiments, the GPU is configured to perform the reconfiguration without destroying the data in the LIB.

As discussed above, the LIB is one example data structure that may be used to store fragment data, but various other structures are contemplated.

Example LIB Write Operations

Figure 5A:
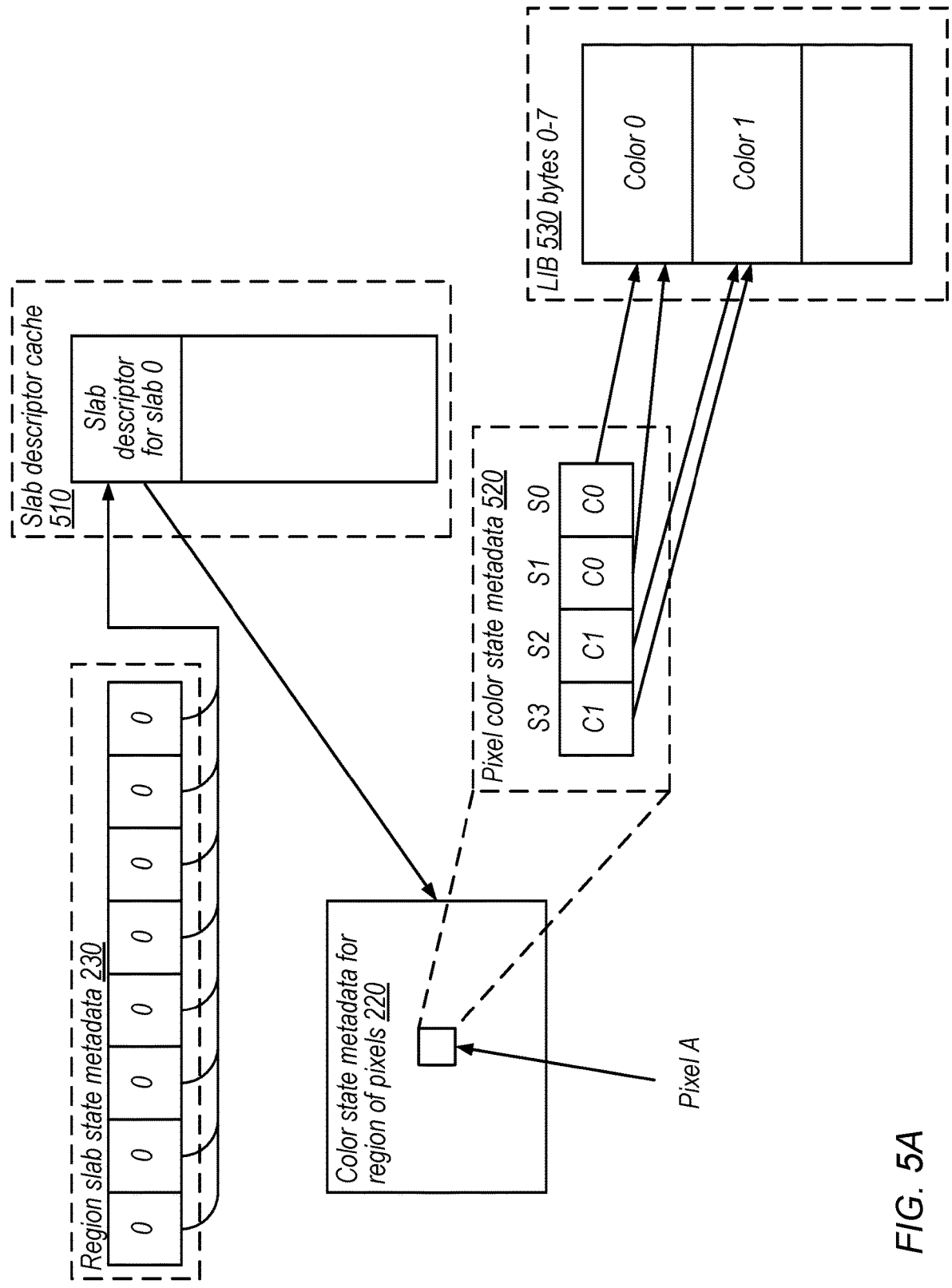
FIG. 5A is a diagram illustrating example elements prior to a write operation, according to some embodiments.

Control circuitry may update various metadata fields to properly implement read and write operations for the local image block. In some embodiments, a graphics process may request a write operation (e.g., to create or change a sample color of a pixel). In some cases, a write operation may cause fracturing of a slab descriptor into multiple descriptors. FIGS. 5A-5C, discussed in detail below, illustrate example phases of a write operation including: example state prior to the write operation (FIG. 5A), example state subsequent to a write operation that does not cause fracturing (FIG. 5B), and example state subsequent to a write operation that causes fracturing (FIG. 5C). Note that FIGS. 5B and 5C show state updates for different write operations that occur independently based on the initial state depicted in FIG. 5A.

FIG. 5A is a diagram illustrating example metadata state prior to a write operation, according to some embodiments. The illustrated example shows region slab state metadata 230, slab descriptor cache 510, color state metadata for region of pixels 220, pixel color state metadata 520, and LIB 530.

In the illustrated embodiment, pixel color state metadata 520 represents the color state metadata for a pixel in a region of pixels. For example, the pixel A corresponding to pixel color state metadata 520 has four samples (e.g., for 4×MSAA mode) referred to as S0-S3, where samples S0 and S1 map to C0 (e.g., color 0) and samples S2 and S3 map to C1 (e.g., color 1). Pixel color state metadata 520 provides the mapping of samples for a given pixel to one or more colors in LIB 530. Note that color 0 and color 1 are two different colors from a multitude of different representable colors used for illustration purposes, and any other number of colors may be included in LIB 530. In some embodiments, the number of bits used for each pointer in metadata 520 is selected to allow representation of the greatest possible number of representable colors (e.g., based on the depth of the LIB) and may vary in different graphics modes.

In the illustrated embodiment, all bytes of region slab state metadata 230 map to slab descriptor 0 (e.g., slab descriptor for slab 0) in slab descriptor cache 510, indicated by the zero value for each byte. In this example, the LIB is eight bytes deep, but various depths are contemplated and the depth may be programmable.

In some situations, region slab state metadata 230 may map to multiple slab descriptors indicated by the individual bytes of region slab state metadata 230. The number of bits per pointer in region slab metadata 230 may be selected to distinguish among the maximum number of slab descriptors for a given LIB configuration (which may correspond to the number of byte slices of the LIB, for example).

The slab descriptor for slab 0, in the illustrated embodiment, indicates color state metadata 220 for a region of pixels. Note that the slab descriptor for slab zero may indicate multiple different sets of color state metadata for different regions of pixels in a graphics frame, in some situations. As discussed above, the color state metadata 220 includes a set of pixel color state metadata 520 for each pixel in the region, in this embodiment.

In some embodiments, the illustrated data structure may be used to perform a read operation as follows. The read request may include sample information that indicates one or more samples in a region of pixels and an indication of one or more bytes of the LIB 530, for example.

First, in some embodiments, based on the indication of the one or more bytes of the LIB 530, control circuitry is configured to access region slab state metadata 230 to determine color state metadata for region of pixels 220 for the read operation. Second, in some embodiments, control circuitry is further configured to access the determined color state metadata for region of pixels 220 and corresponding pixel color state metadata 520 for pixel A, based on the sample information, to determine a location of color data in the LIB 530 for one or more samples. The control circuitry may then access the color data at the location and provide it in response to the request. Reads and writes may be performed based on instructions of a shader program, for example.

In some embodiments, a write operation may write to all bytes or to a subset of bytes in LIB 530. The state of the depicted elements of FIG. 5A may change based on whether a write operation writes to all bytes or a subset of bytes. In some embodiments, in response to writing to a subset of bytes, slab descriptor cache 510 may fracture to create a slab descriptor for another slab (e.g., slab descriptor for slab 1). Fracturing may involve initially replicating a slab descriptor and then updating the new descriptor, as discussed in further detail below with respect to FIG. 5C.

Figure 5B:
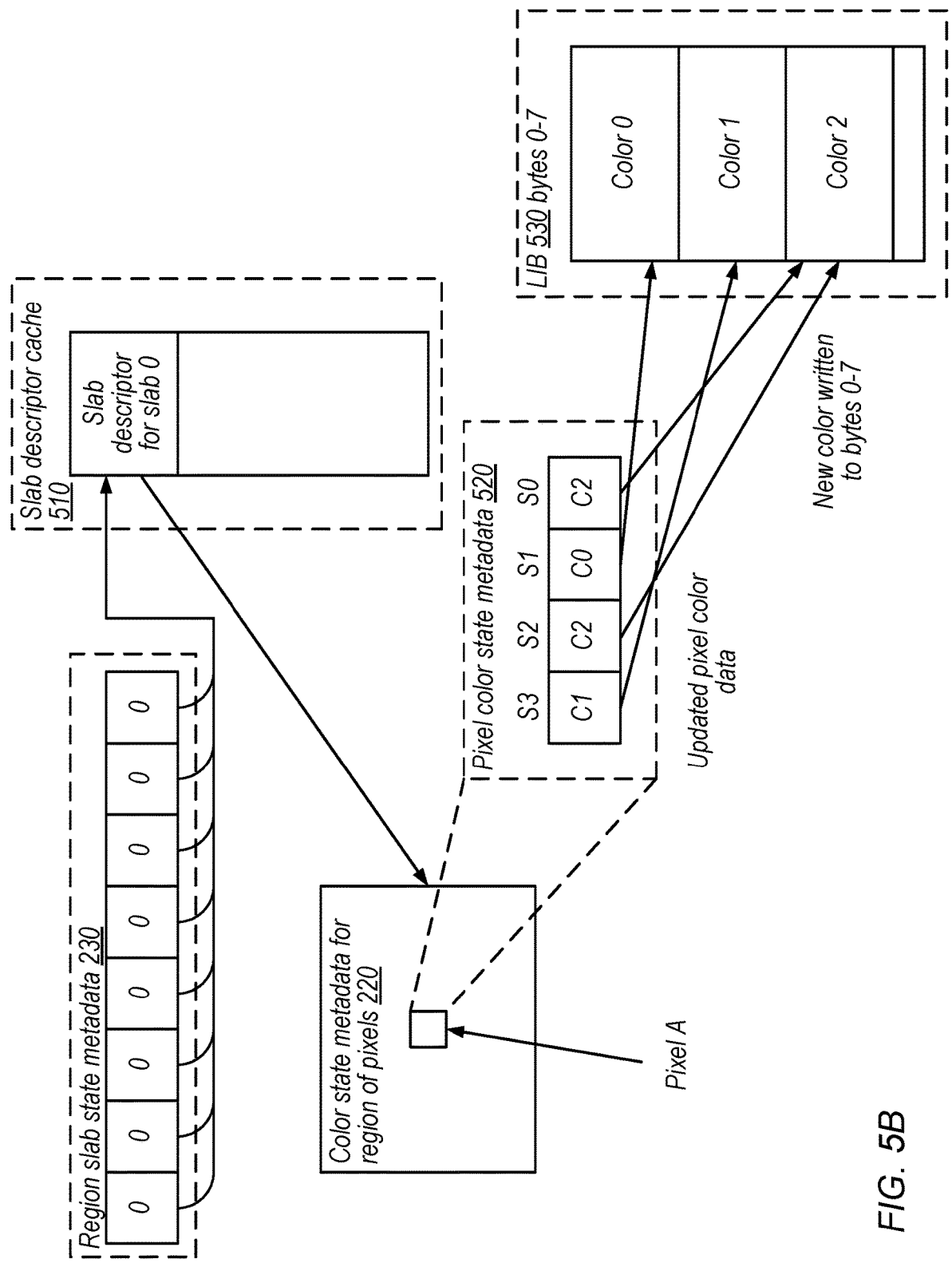
FIG. 5B is a diagram illustrating example elements subsequent to a write operation that does not cause fracturing, according to some embodiments.
Figure 5C:
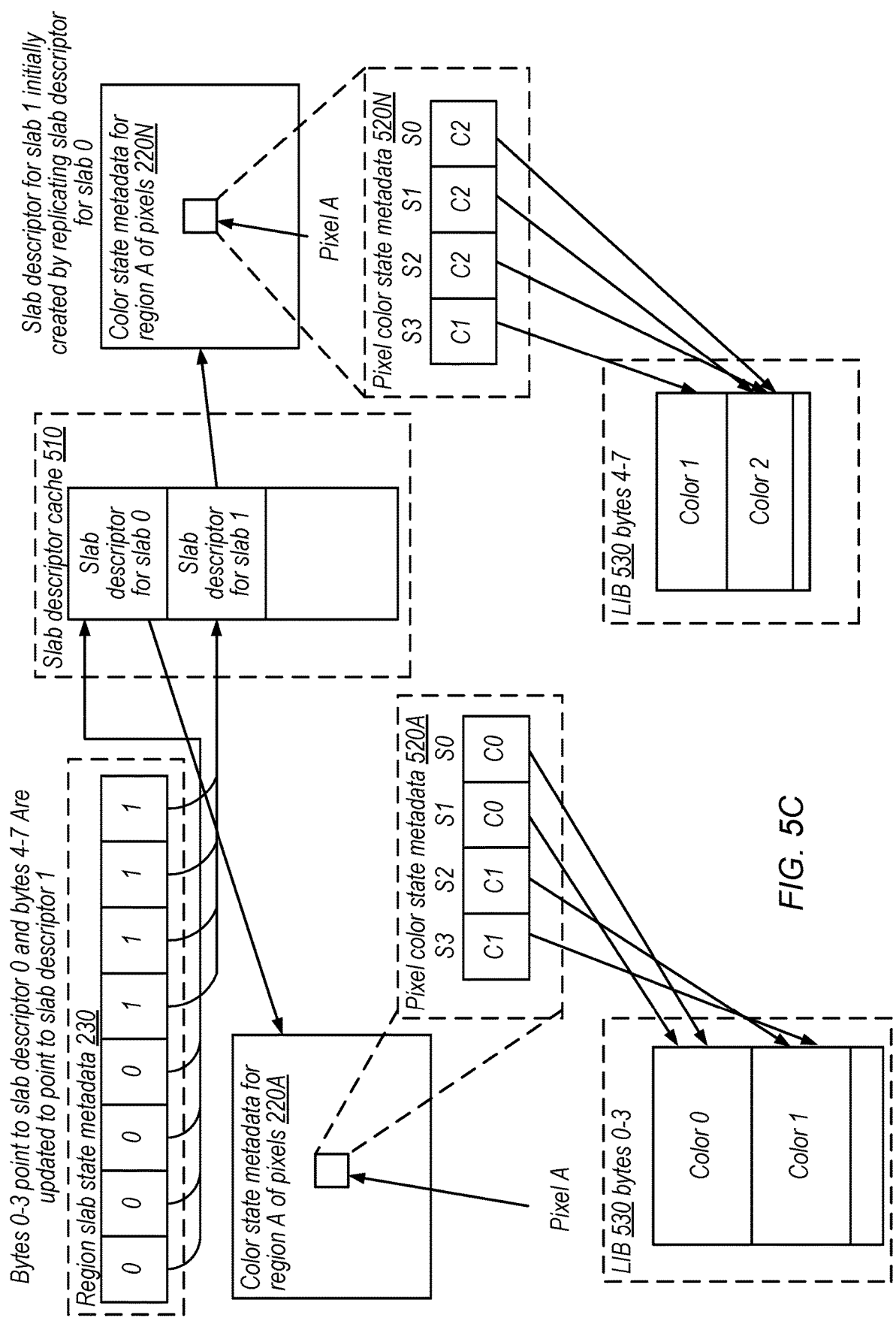
FIG. 5C is a diagram illustrating example elements subsequent to a write operation that causes fracturing, according to some embodiments.

Turning now to FIG. 5B, a diagram illustrating example metadata state subsequent to a write operation that does not cause fracturing is shown, according to some embodiments. In the illustrated embodiment, a new color (color 2 (C2)) is written to bytes 0-7 (all bytes in this example) of the LIB 530 for pixel A. FIG. 5B depicts updates to the pixel color state metadata 520 and LIB 530 as a result of the write operation.

For example, in the illustrated embodiment, in response to writing C2 to bytes 0-7 of the LIB 530, the pixel color state metadata 520 for pixel A is updated accordingly: samples S1 and S3 remain mapped to colors C0 and C1 in the LIB 530, respectively, while samples S0 and S2 now map to the new color C2 in the LIB 530. Given that all bytes of a current slab (slab 0) are written to, no fracturing of slab descriptor cache 510 occurs.

Turning now to FIG. 5C, a diagram illustrating example metadata state subsequent to a write operation that causes fracturing is shown, according to some embodiments. In the illustrated embodiment, a new color is written to bytes 0-3 (a subset of bytes) of the LIB 530 for pixel A.

In the illustrated example, this causes several metadata updates. For example, control circuitry fractures the slab descriptor to create slab descriptor 0 and slab descriptor 1 in slab descriptor cache 510. This may include initially replicating color state metadata 220A (color state metadata 220N), generating the slab descriptor for slab 1 to point to the replicated color state metadata 220N, and updating pixel color state metadata 520N to map the corresponding samples to colors 1 and 2 in LIB 530. In some embodiments, pixel color state metadata 520N references a different subset of bytes in the depth dimension of LIB 530. Note that pixel color state metadata 520A, which corresponds to slab descriptor 0, remains unchanged. As shown, the fracturing may also update bytes 4-7 of region slab state metadata 230 to reference slab descriptor 1 in slab descriptor cache 510. Note that slab descriptors 0 and 1 are slab descriptors for different subsets of the depth dimension of the LIB 530.

As shown, disclosed techniques may initially use a single slab descriptor or a small number of slab descriptors and add slab descriptors as needed. This may in turn allow color state metadata to be shared by multiple slabs, when possible, which may allow for efficient storage and improved cache efficiency for disclosed metadata.

Note that writes to LIB 530 may eventually cause fracturing into up to a greatest supported number of slabs (e.g., eight in the illustrated example).

In some embodiments, a read operation that occurs subsequent to a write operation that causes fracturing may read across multiple slabs. In some embodiments, a read to a set of bytes that reference multiple slab descriptors is implemented using multiple read operations. For example, still referring to FIG. 5C, reading bytes 2-5 may use two read operations because bytes 2-3 reference slab descriptor 0 and bytes 4-5 reference slab descriptor 1. In such situations, control circuitry performs a first read operation for bytes 2-3 by referencing slab descriptor 0 and a second read operation for bytes 4-5 by referencing slab descriptor 1. Thus, the first read operation accesses pixel color state metadata 520A (and thus LIB 530 bytes 0-3) while the second read operation accesses pixel color state metadata 520N (and thus LIB 530 bytes 4-7), to retrieve corresponding color data.

Note that, in some embodiments, only samples of the same pixel can share a given color in LIB 530. In other embodiments, samples from different pixels may point to the same color in LIB 530, but these embodiments may require a greater number of pointer bits per sample, which may or may not improve overall efficiency, depending on the workload.

Example Method

Figure 6:
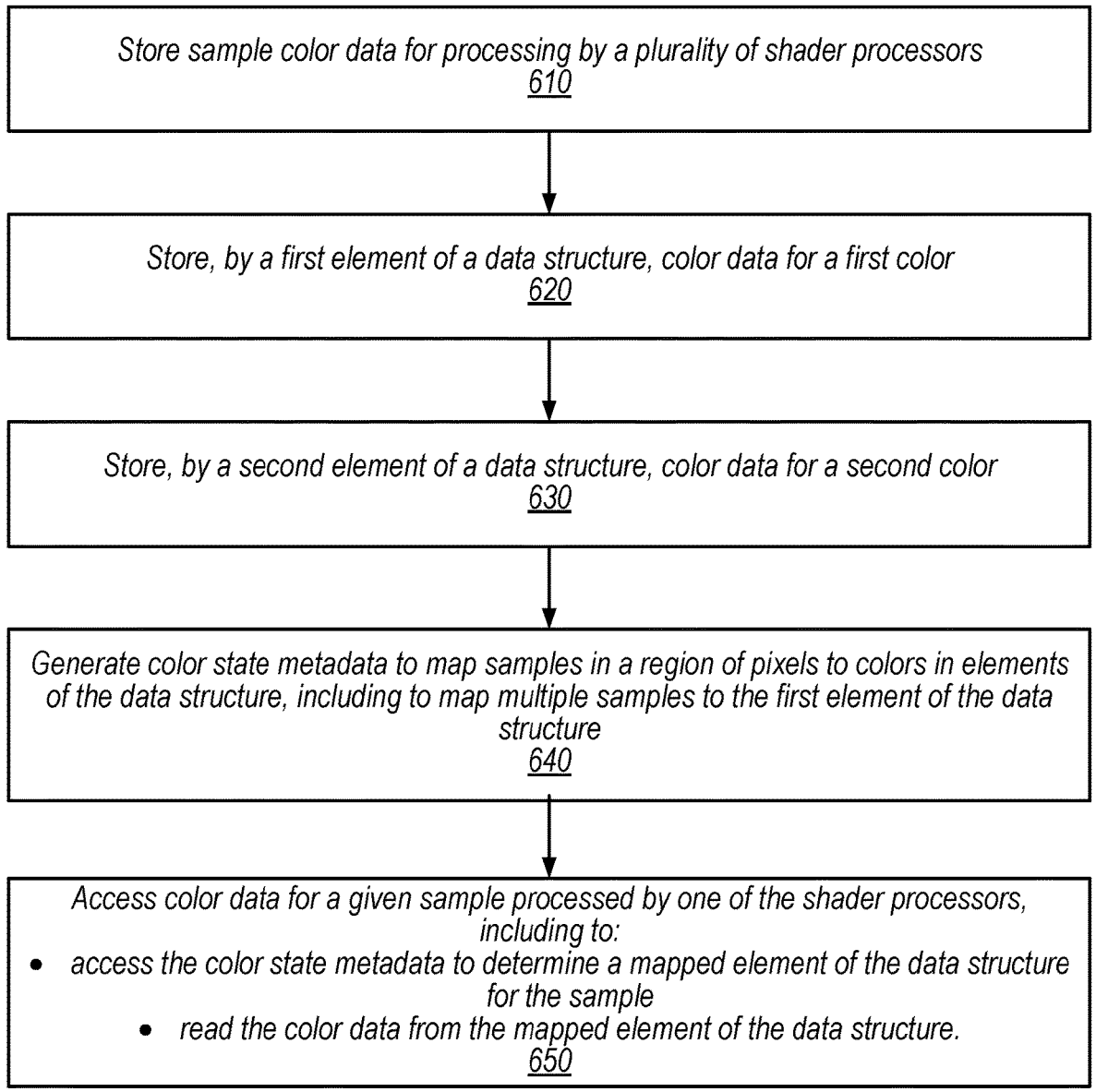
FIG. 6 is a flow diagram illustrating an example method for color state techniques, according to some embodiments.

FIG. 6 is a flow diagram illustrating an example method for color state techniques, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, one or more storage circuits store sample color data for processing by a plurality of shader processors. In some embodiments, this storage uses a data structure such as the LIB.

At 620, in the illustrated embodiment, a first element of the data structure stores color data for a first color. In some embodiments, the data structure is a multi-dimensional data structure that stores color data and may be referred to as a local image block.

At 630, in the illustrated embodiment, a second element of the data structure stores color data for a second color.

At 640, in the illustrated embodiment, control circuitry generates color state metadata to map samples in a region of pixels to colors in elements of the data structure, including to map multiple samples to the first element of the data structure.

In some embodiments, color state metadata maps samples in a region of pixels to colors in the LIB. The color state metadata may map multiple samples to the same element of the LIB when the samples share a color.

At 650, in the illustrated embodiment, control circuitry accesses color data for a given sample processed by one of the shader processors. In some embodiments, control circuitry accesses the color state metadata to determine a mapped element of the data structure for the sample and reads the color data from the mapped element of the data structure.

In some embodiments, the data structure includes multiple addressable locations in a first dimension (e.g., depth dimension). In some embodiments, the one or more storage circuits store region slab state metadata that maps different locations of the data structure in the first dimension to different subsets of the color state metadata. In some embodiments, the subsets of the color state metadata correspond to slabs of one or more locations in the first dimension of the data structure.

In some embodiments, at a first point in time, region slab state metadata maps a set of multiple locations in the first dimension to a first subset of the color state metadata for a first slab. In some embodiments, at a second point in time, region slab state metadata maps different locations in the first dimension to different subsets of color state metadata for different slabs.

In some embodiments, the data structure includes a number of bytes in a first dimension and the different locations in the first dimension of the data structure are byte slices.

In some embodiments, control circuitry, in response to a write to a subset of the multiple addressable locations in the first dimension that corresponds to a slab of the data structure that has not previously been accessed as a slab, generates a subset of color state metadata for the slab.

In some embodiments, control circuitry, in response to a write to a previously-accessed slab of the data structure, updates the color state metadata for the previously-accessed slab to include one or more pointers to written data.

In some embodiments, control circuitry performs a read operation. In some embodiments, control circuitry accesses the region slab state metadata, based on an indication of the one or more addressable locations, to determine color state metadata for the read operation. In some embodiments, control circuitry further accesses the determined color state metadata, based on sample information, to determine a location of color data in the data structure for the one or more samples.

Example Device

Figure 7:
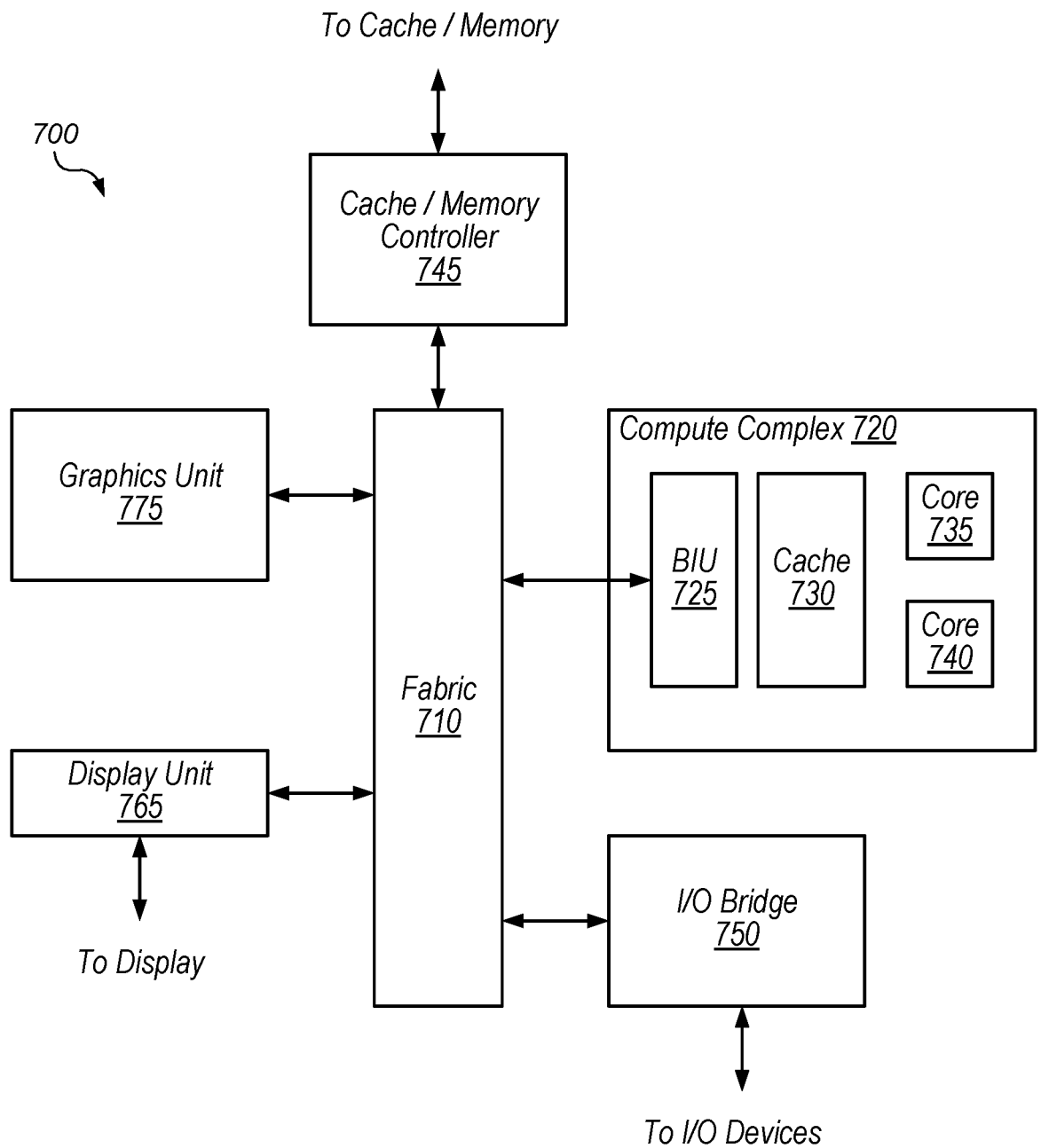
FIG. 7 is a block diagram illustrating an example computing device, according to some embodiments.

Referring now to FIG. 7, a block diagram illustrating an example embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 775, and display unit 765. In some embodiments, device 700 may include other components (not shown) in addition to or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and caches. For example, compute complex 720 may include 1, 2, or 4 processor cores, or any other suitable number. In one embodiment, cache 730 is a set associative L2 cache. In some embodiments, cores 735 and 740 may include internal instruction and data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions.

Cache/memory controller 745 may be configured to manage transfer of data between fabric 710 and one or more caches and memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches.

As used herein, the term "coupled to" may indicate one or more connections between elements, and a coupling may include intervening elements. For example, in FIG. 7, graphics unit 775 may be described as "coupled to" a memory through fabric 710 and cache/memory controller 745. In contrast, in the illustrated embodiment of FIG. 7, graphics unit 775 is "directly coupled" to fabric 710 because there are no intervening elements.

Graphics unit 775 may include one or more processors, e.g., one or more graphics processing units (GPU's). Graphics unit 775 may receive graphics-oriented instructions, such as OPENGL®, Metal, or DIRECT3D® instructions, for example. Graphics unit 775 may execute specialized GPU instructions or perform other operations based on the received graphics-oriented instructions. Graphics unit 775 may generally be configured to process large blocks of data in parallel and may build images in a frame buffer for output to a display, which may be included in the device or may be a separate device. Graphics unit 775 may include transform, lighting, triangle, and rendering engines in one or more graphics processing pipelines. Graphics unit 775 may output pixel information for display images. Graphics unit 775, in various embodiments, may include programmable shader circuitry which may include highly parallel execution cores configured to execute graphics programs, which may include pixel tasks, vertex tasks, and compute tasks (which may or may not be graphics-related).

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and low-power always-on functionality, for example. I/O bridge 750 may also include interfaces such as pulse-width modulation (PWM), general-purpose input/output (GPIO), serial peripheral interface (SPI), and inter-integrated circuit (I2C), for example. Various types of peripherals and devices may be coupled to device 700 via I/O bridge 750.

In some embodiments, device 700 includes network interface circuitry (not explicitly shown), which may be connected to fabric 710 or I/O bridge 750. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 700 with connectivity to various types of other devices and networks.

Various elements of FIG. 7 may utilize disclosed techniques. For example, color data 210, LIB 530, or both may be stored by graphics unit 775 and accessed using disclosed techniques. Disclosed techniques may advantageously enable sparse/compressed color data for a region of pixels, in various embodiments.

Example Applications

Figure 8:
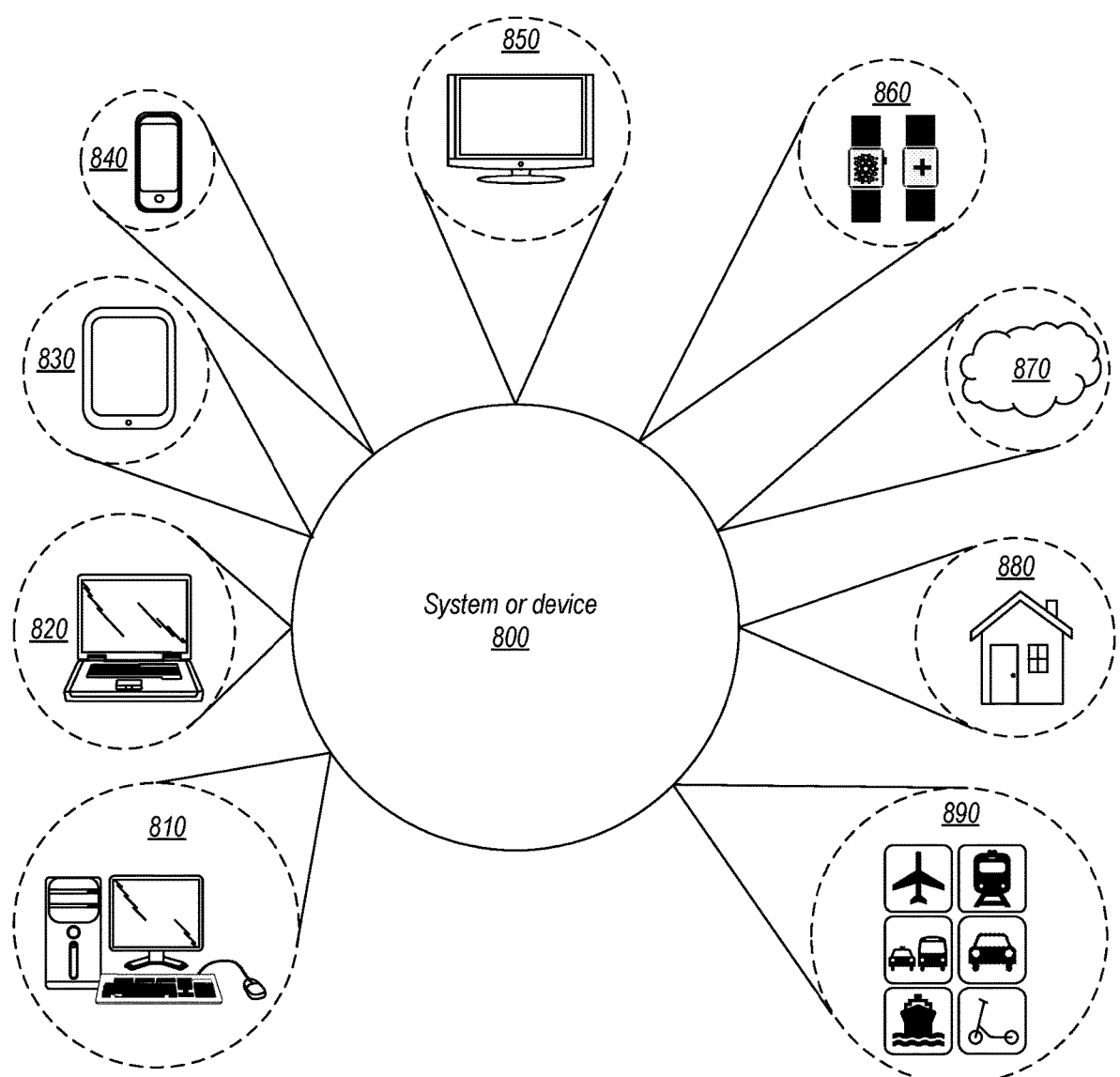
FIG. 8 is a diagram illustrating example applications of disclosed systems and devices, according to some embodiments.

Turning now to FIG. 8, various types of systems that may include any of the circuits, devices, or system discussed above. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 9:
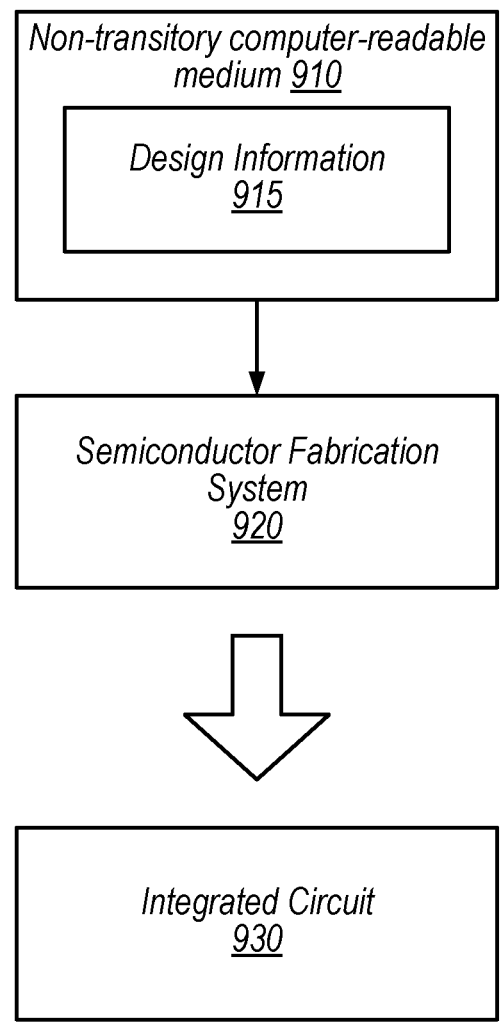
FIG. 9 is a block diagram illustrating an example computer-readable medium that stores circuit design information, according to some embodiments.

FIG. 9 is a block diagram illustrating an example non-transitory computer-readable storage medium that stores circuit design information, according to some embodiments. In the illustrated embodiment semiconductor fabrication system 920 is configured to process the design information 915 stored on non-transitory computer-readable medium 910 and fabricate integrated circuit 930 based on the design information 915.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Non-transitory computer-readable storage medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system 920. In some embodiments, design information 915 may also include one or more cell libraries which specify the synthesis, layout, or both of integrated circuit 930. In some embodiments, the design information is specified in whole or in part in the form of a netlist that specifies cell library elements and their connectivity. Design information 915, taken alone, may or may not include sufficient information for fabrication of a corresponding integrated circuit. For example, design information 915 may specify the circuit elements to be fabricated but not their physical layout. In this case, design information 915 may need to be combined with layout information to actually fabricate the specified circuitry.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown in FIGS. 1B and 7. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   a plurality of shader processors;
   one or more storage circuits configured to store sample color data for processing by the shader processors, including a data structure that includes:
      a first element configured to store color data for a first color; and
      a second element configured to store color data for a second color;
   control circuitry configured to:
      generate color state metadata to map samples in a region of pixels to colors in elements of the data structure, including to map multiple samples to the first element of the data structure; and
      to access color data for a given sample processed by one of the shader processors:
         access the color state metadata to determine a mapped element of the data structure for the sample; and
         read the color data from the mapped element of the data structure.

2. The apparatus of claim 1, wherein the data structure includes multiple addressable locations in a first dimension;
   wherein the one or more storage circuits are further configured to store region slab state metadata that maps different locations of the data structure in the first dimension to different subsets of the color state metadata, wherein the subsets of the color state metadata correspond to slabs of one or more locations in the first dimension of the data structure.

3. The apparatus of claim 2, wherein:
   at a first point in time, the region slab state metadata maps a set of multiple locations in the first dimension to a first subset of the color state metadata for a first slab; and
   at a second point in time, the region slab state metadata maps different locations in the first dimension to different subsets of color state metadata for different slabs.

4. The apparatus of claim 2, wherein the data structure includes a number of bytes on a first dimension;
   wherein the different locations in the first dimension of the data structure are byte slices.

5. The apparatus of claim 2, wherein the control circuitry is further configured to:
   in response to a write to a subset of the multiple addressable locations in the first dimension that corresponds to a slab of the data structure that has not previously been accessed as a slab, generate a subset of color state metadata for the slab.

6. The apparatus of claim 2, wherein the control circuitry is further configured to:
   in response to a write to a previously-accessed slab of the data structure, update the color state metadata for the previously-accessed slab to include one or more pointers to written data.

7. The apparatus of claim 2, wherein to perform a read operation, the control circuitry is configured to:
   access the region slab state metadata, based on an indication of the one or more addressable locations, to determine color state metadata for the read operation; and
   access the determined color state metadata, based on sample information, to determine a location of color data in the data structure for the one or more samples.

8. The apparatus of claim 1, wherein the control circuitry is configured to determine that the multiple samples correspond to the same color data and map the multiple samples to the first element of the data structure based on the determination.

9. The apparatus of claim 1, wherein the control circuitry is configured to generate color state metadata that maps samples from multiple different pixels to the same element of the data structure.

10. The apparatus of claim 1, wherein the apparatus is a computing device that further includes:
    a display;
    a central processing unit; and
    network interface circuitry.

11. A method, comprising:
    storing, by one or more storage circuits, sample color data for processing by a plurality of shader processors, including:
       a data structure that includes:
          storing, by a first element, color data for a first color; and
          storing, by a second element, color data for a second color
       generating, by control circuitry, color state metadata to map samples in a region of pixels to colors in elements of the data structure, including to map multiple samples to the first element of the data structure; and accessing, by control circuitry, color data for a given sample processed by one of the shader processors, including:
- accessing, by control circuitry, the color state metadata to determine a mapped element of the data structure for the sample; and
- reading, by control circuitry, the color data from the mapped element of the data structure.

12. The method of claim 11, further comprising:
storing, by the one or more storage circuits, region slab state metadata that maps different locations of the data structure in a first dimension to different subsets of the color state metadata that correspond to slabs of one or more locations in the first dimension of the data structure.

13. The method of claim 12, further comprising:
mapping, at a first point in time, a set of multiple locations in the first dimension to a first subset of the color state metadata for a first slab; and
mapping, at a second point in time, different locations in the first dimension to different subsets of color state metadata for different slabs.

14. The method of claim 12, further comprising:
generating, by control circuitry, in response to a write to a subset of multiple addressable locations in the first dimension that corresponds to a slab of the data structure that has not previously been accessed as a slab, a subset of color state metadata for the slab.

15. The method of claim 12, further comprising:
updating, by control circuitry, in response to a write to a previously-accessed slab of the data structure, the color state metadata for the previously-accessed slab to include one or more pointers to written data.

16. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
- a plurality of shader processors;
- one or more storage circuits configured to store sample color data for processing by the shader processors, including:
  - a data structure that includes:
    - a first element configured to store color data for a first color; and
    - a second element configured to store color data for a second color;
- control circuitry configured to:
  - generate color state metadata to map samples in a region of pixels to colors in elements of the data structure, including to map multiple samples to the first element of the data structure; and
  - to access color data for a given sample processed by one of the shader processors:
    - access the color state metadata to determine a mapped element of the data structure for the sample; and
    - read the color data from the mapped element of the data structure.

17. The computer readable storage medium of claim 16, wherein the data structure includes multiple addressable locations in a first dimension;
wherein the one or more storage circuits are further configured to store region slab state metadata that maps different locations of the data structure in the first dimension to different subsets of the color state metadata, wherein the subsets of the color state metadata correspond to slabs of one or more locations in the first dimension of the data structure.

18. The computer readable storage medium of claim 17, wherein:
at a first point in time, the region slab state metadata maps a set of multiple locations in the first dimension to a first subset of the color state metadata for a first slab; and
at a second point in time, the region slab state metadata maps different locations in the first dimension to different subsets of color state metadata for different slabs.

19. The computer readable storage medium of claim 17, wherein the data structure includes a number of bytes on a first dimension;
wherein the different locations in the first dimension of the data structure are byte slices.

20. The computer readable storage medium of claim 17, wherein the control circuitry is further configured to:
in response to a write to a subset of the multiple addressable locations in the first dimension that corresponds to a slab of the data structure that has not previously been accessed as a slab, generate a subset of color state metadata for the slab.

* * * * *